United States Patent [19]

Hamada et al.

[11] Patent Number: 4,613,967
[45] Date of Patent: Sep. 23, 1986

[54] DISC PLAYER

[75] Inventors: Yuichiro Hamada; Kazuhiko Fujiie, both of Tokyo; Masanori Ohtawa, Kanagawa; Chiaki Nonaka, Kanagawa; Tadao Yoshida, Kanagawa; Yoshiaki Haneda, Tokyo, all of Japan

[73] Assignee: Sony Corporation, Tokyo, Japan

[21] Appl. No.: 372,125

[22] Filed: Apr. 27, 1982

[30] Foreign Application Priority Data

Apr. 30, 1981 [JP] Japan .................................. 56-65656

[51] Int. Cl.$^4$ ................................................ G11B 7/00
[52] U.S. Cl. ...................................... 369/221; 369/41; 369/219; 369/223; 369/233
[58] Field of Search ................. 369/219, 41, 221, 223, 369/233

[56] References Cited

U.S. PATENT DOCUMENTS

| 4,271,334 | 6/1981 | Yardy ...................................... 369/41 |
| 4,301,526 | 11/1981 | Morii et al. ............................. 369/41 |
| 4,307,418 | 12/1981 | Mindel et al. .......................... 369/41 |

Primary Examiner—Steven L. Stephan
Attorney, Agent, or Firm—Lewis H. Eslinger; Alvin Sinderbrand

[57] ABSTRACT

An apparatus for reproducing information signals recorded in spiral or coaxial tracks of a record disc includes a pick-up device operative, upon scanning of a track of the disc while the latter is rotated, to reproduce the information signals recorded in the scanned track; a driver for rotating the record disc relative to the pick-up device; a tracking device for controlling the tracing of the tracks by the pick-up device; a transporting device for bodily moving the pick-up device in a radial direction in respect to the axis of rotation of the record disc and thereby normally determining the tracks to be scanned by the pick-up device; and a controller selectively operative for causing the pick-up device to intermittently trace nonadjacent groups of tracks so as to intermittently reproduce the information signal recorded in the nonadjacent groups of tracks, respectively.

9 Claims, 7 Drawing Figures

DISC PLAYER

BACKGROUND OF THE INVENTION

1. Field of the Invention

The present invention relates generally to an apparatus for reproducing information signals recorded in spiral or coaxial tracks of a record disc and is directed more particularly to a digital audio disc player for reproducing digital audio information recorded on a record disc.

2. Description of the Prior Art

A device for reproducing or playing back digital audio information recorded on a digital audio disc (hereinbelow simply referred to as DAD), which is also referred to as a compact disc, will be now described with reference to FIG. 1. In FIG. 1, reference numeral 1 designates a DAD which is rotated by a spindle motor 2 in the counter-clockwise direction viewed from the underside of the DAD 1. A pick-up apparatus or device 3 is located to oppose the DAD 1 from its underside and is moved usually in a radial direction in respect to the axis of rotation of the record disc or DAD 1 by a moving or transporting mechanism consisting of a worm gear 4 and a motor 5 for rotating the former. A detecting device 6 is provided for detecting the speed of rotation of spindle motor 2. The signal detected by detecting device 6 is applied to a control circuit 7, which controls motor 5, whereby motor 5 is rotated a predetermined amount at every one revolution of the DAD 1. Further, a signal indicating the position of pick-up device 3 is supplied to a control circuit 8, which controls spindle motor 2, such that the DAD 1 is rotated at a constant linear velocity.

FIG. 2 is a mainly cross-sectional linear diagram schematically showing the construction of the pick-up device 3. In the embodiment shown in FIG. 2, an outer casing 10 houses a laser light source 11 made of, for example, a semiconductor laser. The laser light beam emitted from laser light source 11 is conducted through a beam splitter 12 to an objective lens 13. The light beam passed through the lens 13 is irradiated and focused as a light beam spot on the information surface of the DAD 1. The light beam reflected from the surface of the DAD 1 passes through objective lens 13 to beam splitter 12, is reflected thereon and then supplied to a photo detector 14. The information signal carried by the reflected light beam is detected by photo detector 14 and supplied to an output terminal 15. In addition, within a portion of photo detector 14 are generated a focusing servo control signal and a tracking servo control signal, each of which will be described later.

Reference number 16 in FIG. 2 represents a hollow cylinder having upper and lower ends which are coupled to outer casing 10 of pick-up device 3 by springs 17a and 17b, respectively, thereby allowing hollow cylinder 16 to be axially movable.

Further, hollow cylinder 16 is provided with a flange 18 at, for example, a lower portion thereof. Flange 18 includes a cylindrical bobbin 19 formed coaxially with hollow cylinder 16.

Reference numeral 21 in FIG. 2 designates a magnet attached to the casing 10. Each pole of magnet 21 is respectively connected to an outer end of yokes 22a and 22b, each of which is made of magnetic material. The inner ends of yokes 22a and 22b are extended to be located near the outer and inner peripheries of the coil 20, respectively.

Within hollow cylinder 16 are further provided two plate or leaf springs 23a and 23b each of which extends parallel with respect to the other from the lower end portion of hollow cylinder 16 to the upper end portion thereof. Object lens 13 is supported between the tip ends (upper ends) of leaf springs 23a and 23b. Near the upper ends of leaf springs 23a and 23b are provided tracking servo coils 24a and 24b, each of which is wound in the same direction in which leaf springs 23a and 23b extend, that is, in the vertical direction, as shown in FIG. 2. The pick-up device further comprises magnets 25a and 25b which are interposed between respective walls of casing 10 and cylinder 16 at positions opposing coils 24a and 24b.

Accordingly, with the pick-up device 3 shown in FIG. 2 and described above, when an electric current flows through focusing servo coil 20 hollow cylinder 16 moves vertically a distance which is dependent upon the magnitude of the current flowing through focusing servo coil 20. Furthermore, when an electric current flows through tracking servo coils 24a and 24b, leaf springs 23a and 23b move horizontally in either direction a distance which is dependent upon the magnitude of the current flowing through tracking servo coils 24a and 24b.

Thus, with the above-described pick-up device, the light beam emitted from the laser light source 11 through objective lens 13 can be correctly focused on the DAD 1 by supplying the appropriate focusing servo control signal to focusing servo coil 20. Also, if the tracking servo control signal is supplied to tracking servo coils 24a and 24b, the optical axis of objective lens 13 can be adjusted to be coincident with the series of information pits or bumps on the DAD 1.

FIG. 3 is a block diagram showing a modulating circuit for the reproduced signal. In the figure, the signal derived from the output terminal 15 shown in FIG. 2 is supplied to a PLL (phased-locked loop) circuit 31 in which the phase fluctuation component of the reduced signal is detected. The signal from PLL circuit 31 is supplied to a demodulator 32 from which a digital signal is generated. This digital signal generated by demodulator 32 is supplied to a RAM (random access memory) 33 and stored as data therein. Errors in the stored data are corrected by an error correction circuit 34. The error-corrected signal from RAM 33 is supplied to a left-and-right-channel signal separation circuit 35 in which a left-channel signal and a right-channel signal are separated, respectively. The signals separated as set forth above are respectively supplied to D/A (digital-to-analog) conversion circuits 36R and 36L and the analog signals generated by the D/A circuits are respectively supplied to low pass filters 37R and 37L; the filtered analog signals are then respectively supplied to output terminals 38R and 38L. In this manner, digital audio information stored on a digital audio disc, such as the optical type described above, can be reproduced or played back.

A problem with a DAD such as the optical type described above is that the retrieval of information stored on even one of its surfaces requires a very long time period, for example, more than 60 minutes. During such playback, it is not always necessary that a user plays back all recorded information stored on the DAD, the situation may occur where the user wishes to reproduce only a desired portion of the information recorded on the DAD. Thus, it would be advantageous to operate the above-mentioned disc player in a cue (fast forward playback) and a review (rewind playback) mode to that used in tape recorders.

OBJECTS AND SUMMARY OF THE INVENTION

Accordingly, an object of the present invention is to provide a novel apparatus for reproducing information stored on a record medium that avoids the necessity of playing back an entire surface of the record medium to retrieve a desired portion of the recorded information.

Another object of this invention is to provide a disc player which can produce a played back output equivalent to that which is reproduced in the cue and review playback modes.

A further object of the invention is to provide a disc player which is simple in construction but can perform cue and review playbacks.

According to one aspect of the present invention, there is provided an apparatus for reproducing information signals recorded in spiral or coaxial tracks of a record disc which comprises:

(a) pick-up means operative, upon scanning of a track of the disc while the latter is rotated, to reproduce the information signals recorded in the scanned tracks;

(b) driving means for rotating the record disc relative to the pick-up means;

(c) tracking means for controlling the tracing of the tracks by the pick-up means;

(d) transporting means for bodily moving the pick-up means in a radial direction in respect to the axis of rotation of the record disc and thereby normally determining the tracks to be scanned by the pick-up means; and (e) control means selectively operative for causing the pick-up means to intermittently trace nonadjacent groups of tracks so as to intermittently reproduce the information signals recorded in the nonadjacent groups of tracks, respectively.

Other objects, features, and advantages of the present invention will become apparent from the following description taken in conjunction with the accompanying drawings through which like references designate the same elements and parts.

BRIEF DESCRIPTION OF THE DRAWINGS

FIG. 3 is a block diagram showing a demodulating circuit for an information signal reproduced by the disc player shown in FIG. 1;

DESCRIPTION OF THE PREFERRED EMBODIMENT

The present invention will be hereinafter described with reference to the attached drawings.

Figure 1:
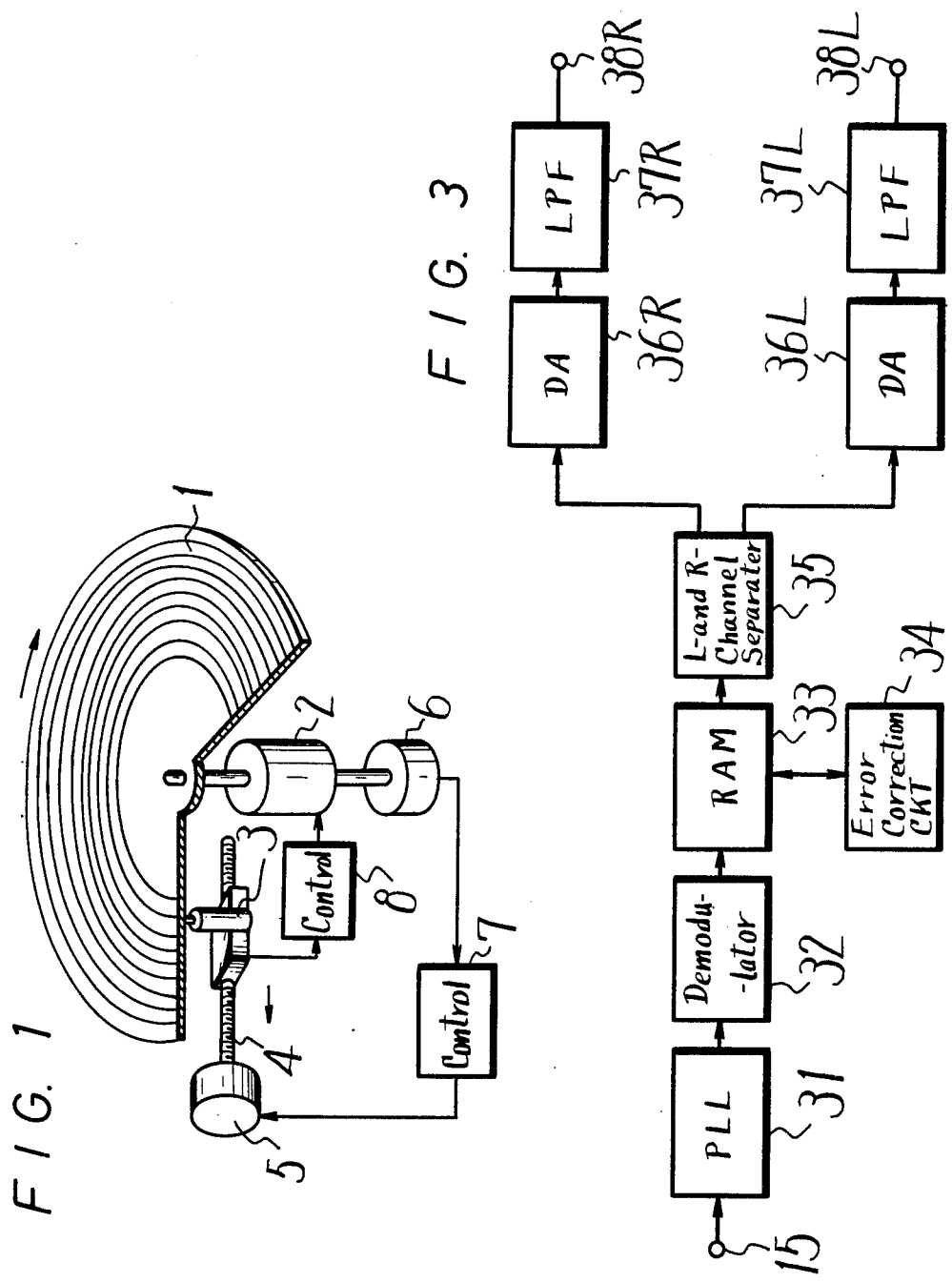
FIG. 1 is a schematic diagram showing a prior art disc player.
Figure 2:
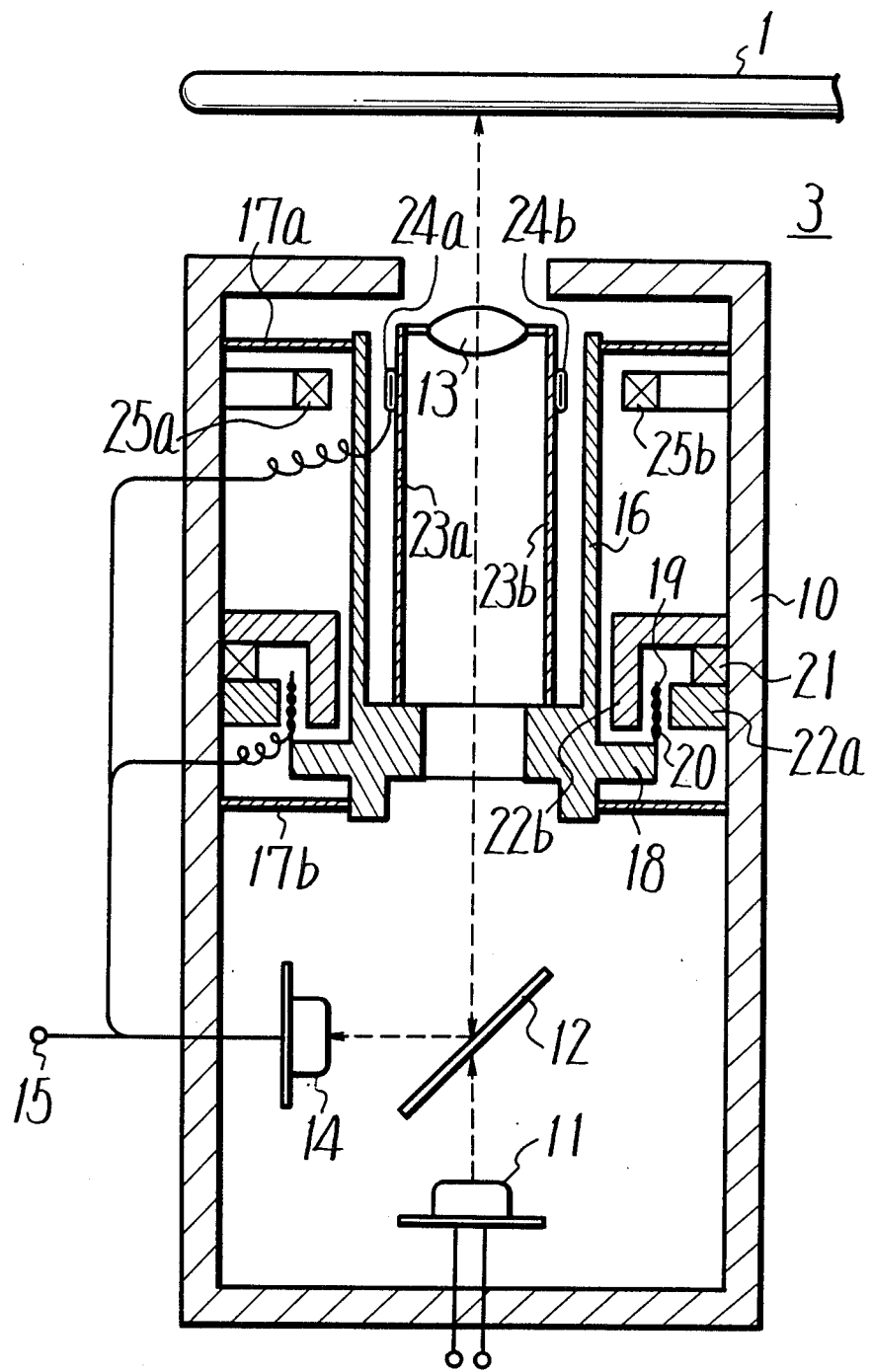
FIG. 2 is a partial cross-sectional view showing in an enlarged scale a part of the disc player shown in FIG. 1.
Figure 4:
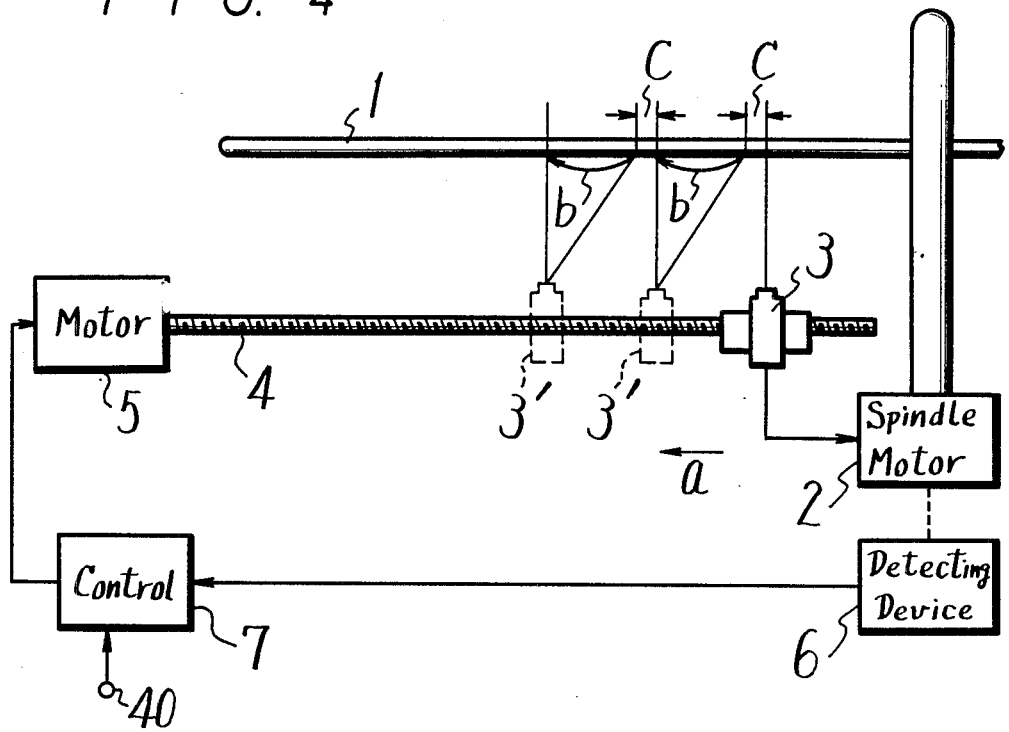
FIGS. 4 and 5 are schematic diagrams showing an essential portion of one embodiment of the disc player according to the present invention.

FIG. 4 shows one embodiment of this present invention used in a situation in which information signals recorded on a disc record are reproduced by a disc player in a mode which is equivalent to the cue playback mode used in tape recorders. Reference numerals of FIG. 4 which are the same as those of FIG. 1 denote the same elements and parts. In the cue playback mode, while spindle motor 2 is rotated at a speed which is similar to that during the normal playback mode, motor 5 is rotated at a speed faster than, for example, fifty times its normal speed when a cue control signal is supplied to the control circuit 7 through a terminal 40.

Accordingly, in such a situation, pick-up device 3 is moved or transported in the direction indicated by arrow a at a speed which is fifty times greater than that during normal reproduction. The tracking servo and focusing servo actions applied to pick-up device 3 cause the focal point of objective lens 13 to follow in order the series of digital information data (recorded as pits on the DAD 1). If when pick-up device 3 arrives at a position shown by, for example, dotted line 3' in FIG. 4, the tracking servo reaches its critical point beyond which it can no longer effect the scanning of adjacent tracks; the focal point of objective lens 13 skips as indicated by arrows b and the tracking servo is applied to pick-up device 3 again at the front position thereof shown by a dotted line 3'.

Thus, in the cue playback mode, during the time when the tracking servo is effective, a substantially normal playback signal is derived at output terminal 15 of pick-up device 3. In other words, a portion of the DAD 1 indicated by c in FIG. 4 is played back or reproduced and the portion of the DAD 1 indicated by b is skipped; hence, the information signal is intermittently reproduced.

Figure 5:
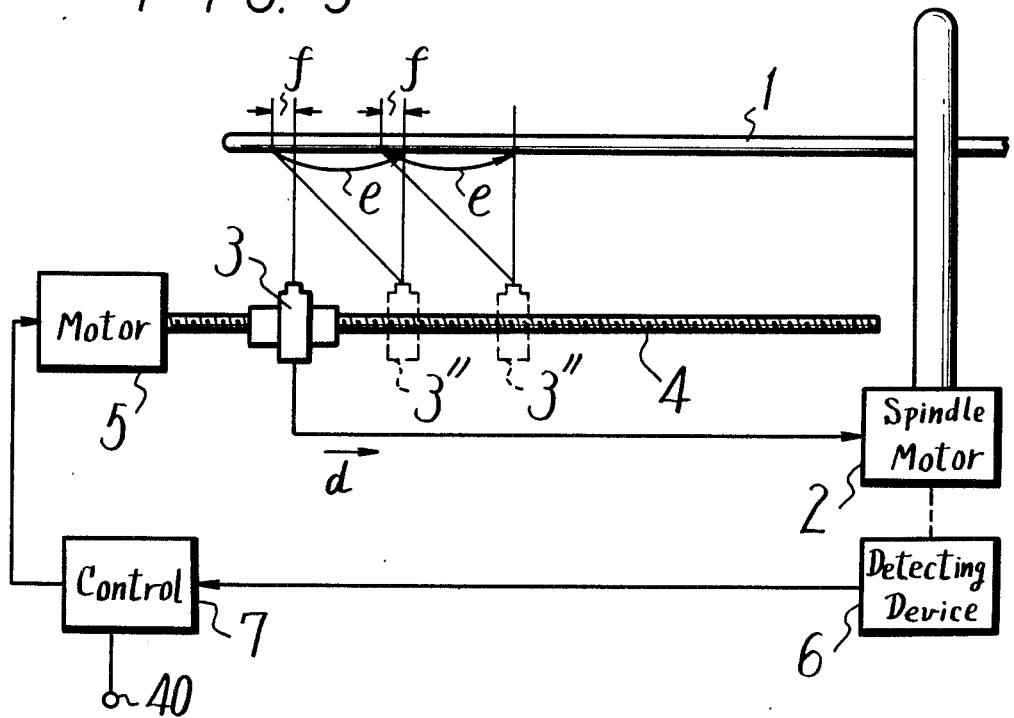

FIG. 5 shows an embodiment of the invention used in a mode which is similar in many respects to the review playback mode used in tape recorders. In the review playback mode, spindle motor 2 is rotated at a speed which is similar to that during the normal playback mode. A review control signal applied to control circuits 7 through terminal 40 causes motor 5 to rotate in the reverse direction at a speed which is, for example, fifty times greater than that during normal reproduction. Accordingly, in the review playback mode, pick-up device 3 is moved in the direction indicated by arrow d at a speed which is fifty times greater than its normal speed. Since the tracking servo and focusing servo are supplied to the pick-up device 3, the focal point of the objective lens 13 is moved in a direction opposite to that in which pick-up device 3 moves in order to follow the information data recorded as a series of pits on the DAD 1. When pick up device 3 arrives at a position shown by, for example, dotted line 3", the tracking servo reaches its critical point. When such occurs, the focal point of the objective lens 13 is forced to jump a portion of DAD 1 as indicated by arrows e and the tracking servo becomes effective again at the front position of pick-up device 3 which has moved to a position as indicated by dotted line 3".

In the review playback mode a substantially normal reproduced signal is supplied to output terminal 15 of pick-up device 3 during the period in which the tracking servo is effective and applied to pick-up device 3. That is, a portion of DAD 1 indicated by f is played back while a portion thereof indicated by the bracket portion e' is skipped and, accordingly, the information signal is intermittently reproduced.

Figure 6:
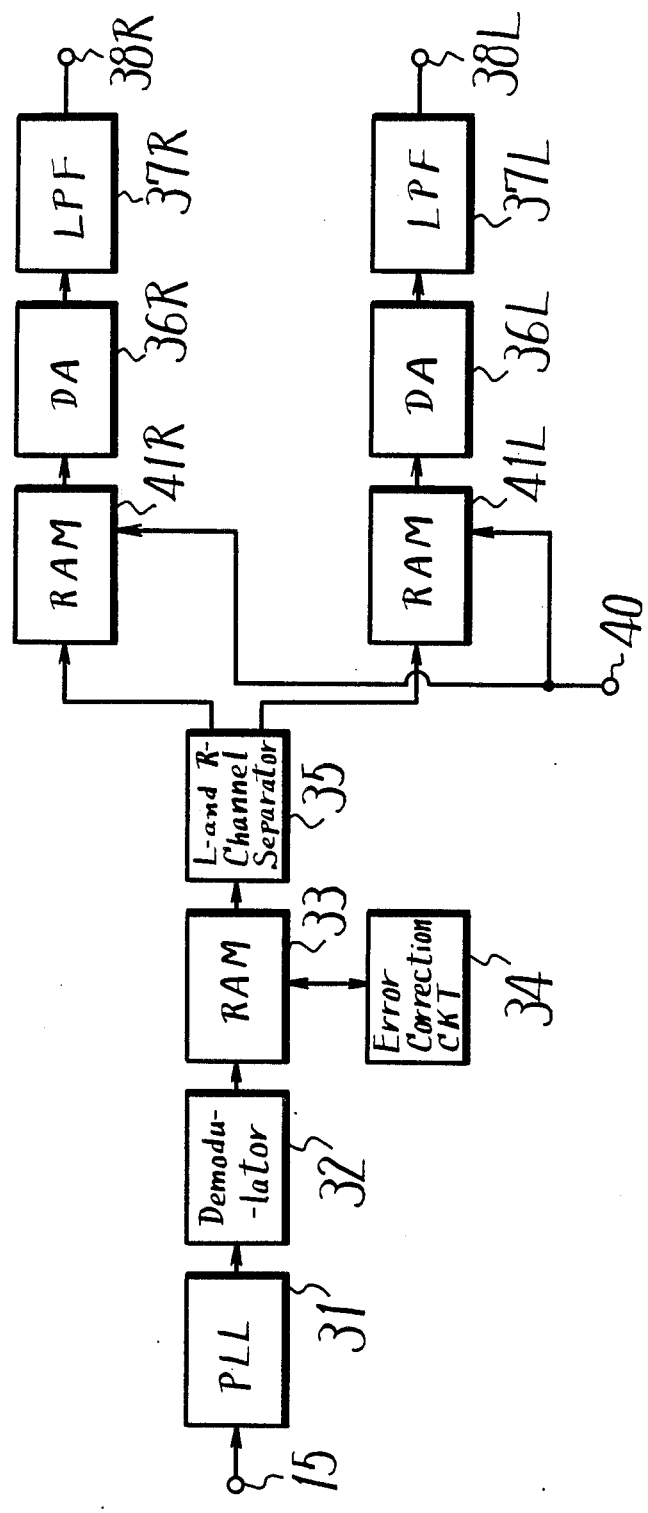
FIG. 6 is a block diagram showing one embodiment of a demodulating circuit according to the invention.

FIG. 6 is a block diagram showing one embodiment of a demodulation circuit for the information signal reproduced as described above. In this figure, the parts and elements similar to those of FIG. 3 are marked with the same reference numerals.

In the embodiment shown in FIG. 6, RAMs (random access memories) 41R and 41L are provided which are supplied signals generated by separating circuit 35. During the normal playback mode, the data written in RAMs 41R and 41L are read out without modification, while during the cue or review playback mode, the lowest bit of the data written in RAMs 41R and 41L is removed and the upper bit thereof is shifted; the data is then outputted from the RAMs.

Accordingly, during the cue and review playback modes, the signals comprising data which is shifted to the lower order are supplied from RAMs 41R and 4L to D/A convertors 36R and 36L, respectively. As a result of such a data shift, a reproduced signal attenuated by 6dB is generated when the data is shifted one bit while a reproduced signal attenuated by 12dB is generated when the data is shifted by two bits. That is, during the cue and review playback modes, there is no need to have the reproduced signal equal to that generated during the normal playback mode. On the contrary, if during the cue or review playback mode the reproduced signal were equal to that generated during the normal playback mode, the reproduced signal would appear as noise. For this reason, the level of the reproduced signal during the cue and review playback modes is lowered as set forth above. Thus, according to this invention, a disc player such as the DAD player described above can perform in the cue and review playback modes.

According to the embodiment of the present invention as presently described, when a compact disc is used, the portion of the DAD which can be scanned by the tracking servo is about ±300 microns. Furthermore, with the compact disc, the rotational velocity of the disc is 200 rpm when the pick-up device is positioned at the outer periphery of the disc, and 500 rpm when the pick-up device is lcoated near the inner periphery of the disc. Thus, during the cue and review playback modes, the duration of each playback carried out is 0.65 seconds, an amount which is sufficient for finding a desired portion of the disc.

It should be noted that during the cue and especially during the review playback modes, the intermittently reproduced sound is normal as opposed to the reversed and thus unclear sound reproduced by the prior art tape recorder. Accordingly, even upon the review playback mode, a good signal detection can be performed.

Further, it should be noted that it is not necessary to limit the speed of motor 5 during cue and review playback modes to the fifty times that of the normal playback. It may also be possible to expand the ranges in which the tracking servo and focusing servo are applied to the pick-up device. Thus, the period in which the playback is carried out becomes long and more superior reproduced sound can be obtained.

The present invention can also be applied to a player which plays back a DAD which utilizes an electrostatic type disc with no grooves or pits.

The attenuation of the reproduced sounds by means of the above-described RAMs 41R and 41L may be used for sound volume adjustments during the normal reproduction mode. According to such method, the deterioration of sound quality caused by the attenuation in the prior art resistor voltage divider method does not result and hence the sound volume can be properly adjusted.

Figure 7:
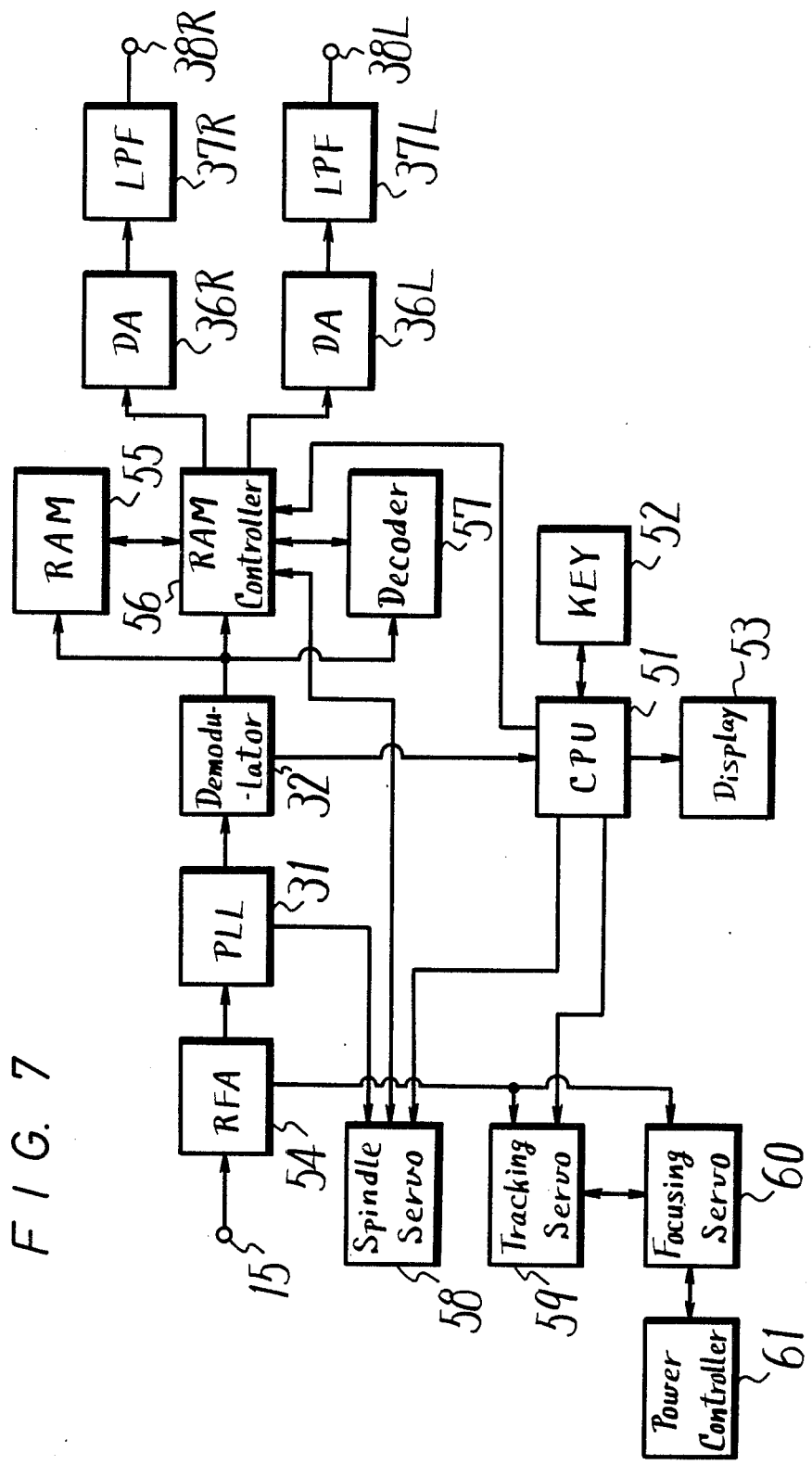
FIG. 7 is a block diagram of a demodulating circuit similar to that shown in FIG. 6 controlled by a CPU (central processing unit).

FIG. 7 is a block diagram showing a demodulating circuit similar to the circuit shown in FIG. 6 which is controlled by a central processing unit (CPU).

In FIG. 7, reference numeral 51 designates a CPU to which are respectively connected an operation key 52 and a display 53 on which the content of the operation and the like are displayed. The signal supplied to the output terminal 15 is fed through an RF (radio frequency) amplifier 54 to the PLL (phase-locked loop) circuit 31. In this figure, a RAM (random access memory) 55 a RAM control circuit or controller 56 and a decoder 57 correspond to RAM 33, error correcting circuit 34, separating circuit 35, and RAMs 41R and 41L shown in FIG. 6 and carry out operations which are similar to those mentioned above in response to the control signal from CPU 51. In FIG. 7, there are also provided a servo circuit 58 for spindle motor 2, a tracking servo circuit 59, a focusing servo circuit 60, and a power control circuit 61

With the circuit shown in FIG. 7, when the operation key 52 is actuated to choose either the cue or review playback modes, signals are supplied from CPU 51 to servo circuits 58, 59 and also to control circuit 56 to attenuate the reproduced sound.

As shown in FIG. 7, servo circuit 58 is supplied with the error output signal from the PLL circuit 31 and the timing of the reproduced signal from demodulator 32 through control circuit 56, in addition to the signal from CPU 51 to perform the servo operation.

Although illustrative embodiments of the present invention have been described herein with reference to the accompanying drawings, it is to be understood that the invention is not limited to those precise embodiments and that various changes and modifications may be effected therein by one skilled in the art without departing from the scope or spirit of this invention, as defined in the appended claims.

We claim as our invention:

1. An apparatus for intermittently reproducing less than the total extent of information signals recorded in substantially concentric tracks on a rotatable record disc; and said apparatus comprising pick-up means operative, upon scanning of a track of said record disc while the latter is rotated, to reproduce the information signals recorded in the scanned track; driving means for rotating said record disc relative to said pick-up means; transporting means for radially moving said pick-up means in either radial direction in respect to the axis of rotation of the record disc and thereby determining which one of said tracks is to be scanned by said pick-up means; tracking means having a predetermined effective range for controlling the scanning of said tracks by said pick-up means; and control means selectively operative in a normal operating mode for causing said pick-up means to scan successive tracks while remaining within said effective range to reproduce the information signals therein, and in a high-speed operating mode to periodically exceed said effective range and thereby to cause said pick-up means to intermittently scan nonadjacent groups of said tracks so as to intermittently reproduce only the information signals recorded in said nonadjacent groups of tracks.

2. An apparatus according to claim 1 in which said tracks are circular and of different radii.

3. An apparatus according to claim 1 in which said tracks constitute successive turns of a spiral path.

4. An apparatus according to claim 1 in which said pick-up means includes a source of light, means for directing a beam of light from said source to said record disc for modulation by the information signals record thereon, and photo-detecting means responsive to the modulated light beam for providing an electrical output corresponding to the respective information signals; and in which said tracking means controls said tracing of the tracks by displacement of the location of impingement of said light beam on said record disc substantially in said radial direction independently of said transporting means.

5. An apparatus according to claim 4; further comprising focussing means operative to maintain the focus of said light beam at said record disc.

6. An apparatus according to claim 5; in which focussing means includes objective lens means through which said light beam passes, means mounting said objective lens means for movements substantially in the direction of the optical axis thereof so as to vary the focus of said light beam, and focus servo means for controlling movements of said objective lens means in said direction of the optical axis so as to maintain said focus at the record disc; and in which said tracking means includes means mounting said objective lens means for movements substantially at right angles to said optical axis in said radial direction of the record disc, and tracking servo means for controlling movements of said objective lens means in said radial direction within said limited range for causing light beam to scan said tracks in succession.

7. An apparatus according to claim 6; further comprising means for attenuating the reproduced information signals when said control means is made operative.

8. An apparatus according to claim 1; further comprising means for attenuating the reproduced information signals when said control means is made operative.

9. An apparatus according to claim 8; in which said information signals recorded on the record disc are audio signals.

* * * * *